United States Patent [19]

Bechman et al.

[11] 3,862,769

[45] Jan. 28, 1975

[54] PIVOT CONSTRUCTION

[75] Inventors: William H. Bechman, Williamsville, N.Y.; Harry G. Barrett, Chambersburg, Pa.

[73] Assignee: Eaton Corporation, Cleveland, Ohio

[22] Filed: Dec. 26, 1973

[21] Appl. No.: 428,141

[52] U.S. Cl................................ 280/400, 403/146
[51] Int. Cl............................................. B62d 53/02
[58] Field of Search.......... 280/400, 461 R; 180/51, 180/52; 403/146, 147

[56] References Cited
UNITED STATES PATENTS

| | | | |
|---|---|---|---|
| 2,344,808 | 3/1944 | Duffield et al. | 403/146 |
| 2,859,983 | 11/1958 | May | 403/146 X |
| 3,347,577 | 10/1967 | Carlson et al. | 403/147 |
| 3,411,809 | 11/1968 | Kampert et al. | 280/400 |
| 3,433,502 | 3/1969 | Omon | 280/400 |
| 3,684,314 | 8/1972 | Molby | 280/400 X |
| 3,711,121 | 1/1973 | Molby | 280/400 |
| 3,778,174 | 12/1973 | Molby | 403/143 |
| 3,806,158 | 4/1974 | Casey | 280/400 |

*Primary Examiner*—Leo Friaglia
*Attorney, Agent, or Firm*—Teagno & Toddy

[57] ABSTRACT

A pivotal connection for an articulated vehicle providing permanently preloaded and automatically adjusted main pivot bearing.

5 Claims, 2 Drawing Figures

PATENTED JAN 28 1975
3,862,769

PIVOT CONSTRUCTION

BACKGROUND OF THE INVENTION

The present invention relates generally to a pivot construction adapted to interconnect a pair of frame members, particularly of an articulated vehicle.

Articulated vehicles of the heavy earth-moving or off-the-road type require pivotal connections between the front and rear frames thereof to effect steering. Operation over rough terrain imposes high stresses upon the pivotal connection between the frame members. It has been a problem with such pivotal connections for articulated vehicles to require the servicing of said pivotal connections after relatively short use of the vehicle for its intended purpose, thus requiring down time to provide for the necessary replacement of the pivotal connection bearings or at least the appropriate adjustment of the pivotal connection. Pivotal connections of the type used in articulated vehicles usually consist of upper and lower bearing pivot structures wherein the axis thereof is disposed vertically to the normal horizontal plane of movement of the articulated vehicle.

The pivotal connections which have heretofore been used have been found to be reasonably acceptable but because of the severe conditions to which the heavy earth-moving type of articulated vehicle is applied, the down time of such vehicles for necessary repairs, adjustment, etc., as related to the pivotal connections, is undesirable.

OBJECTS OF THE INVENTION

It is the primary object of the invention to provide a pivot construction for articulated vehicles of the heavy earth-moving of off-the-road type which does not require manual adjustment.

Another object of the invention is to provide a preloaded pivot-bearing construction mounted between the frame sections of such articulated vehicles wherein no need to distort frame sections is required to obtain the bearing preload.

Another object of the invention is the provision of a pivot construction for an articulated vehicle including a pivot pin and bearing assembly providing means for permanently fixing the spacing of the forward and rear frames of the articulated vehicle.

Another object of the invention is the provision of a pivot construction for articulated vehicles including a main pivot pin bearing so constructed that there is no danger of losing lubricating oil below the uppermost portion of the bearing, because vulnerable seals below this level are unnecessary.

A further object of the invention is the provision of a pivot construction for articulated vehicles of simple construction providing for ease of assembly and disassembly.

A yet further object of the invention is the provision of a pivot construction adapted to be mounted between articulated frames of the vehicle including upper and lower pivot pin bearing structures and wherein one of the bearing structures floats so as to eliminate critical tolerance demands between the upper and lower bearing structures.

A yet further object of the invention is the provision of a pivot construction including spaced-apart upper and lower bearing structures with one of said bearing structures being of a floating construction, thus eliminating the need for heavy pivot plate construction at this location.

SUMMARY OF THE INVENTION

The aforesaid objects of the present invention and other objects which will become apparent as the description proceeds, are achieved by the provision of a pivot construction of novel design wherein upper and lower bearing structures are provided with one of said structures being permanently preloaded and self-adjusting, whereas the other bearing structure is allowed to float. This pivot construction, as aforesaid, is adapted for use primarily with articulated vehicles of the heavy earth-moving type and thus requires the ability to withstand rough usage reducing wear in the bearing structures caused by load transmission between the forward and rear frame sections of the articulated vehicle. Through the automatic adjustment of the one bearing structure and the floating relationship of the other bearing structure, any wear that occurs in the main load-carrying structure is automatically adjusted for, thus eliminating the need for service down time which proves costly in the operation of heavy earth-moving equipment.

BRIEF DESCRIPTION OF THE DRAWING

Although the characteristics of this invention will be particularly pointed out in the claims, the invention itself and the construction thereof, together with the use thereof, may be better understood by reference to the following description taken in connection with the accompanying drawing forming a part hereof and in which:

DETAILED DESCRIPTION OF THE INVENTION

Figure 1:
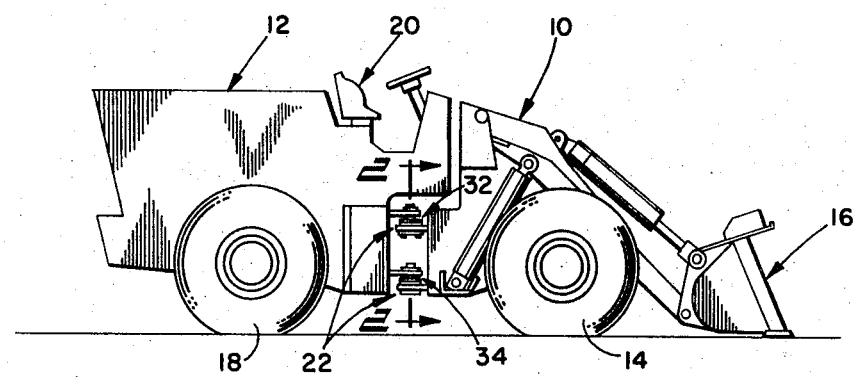
FIG. 1 is a side elevational view of an earth-moving articulated vehicle having the pivot construction of the invention forming a part thereof.

FIG. 1 generally illustrates an articulated heavy earth-moving vehicle having a front section or frame 10 and a rear section or frame 12. The front frame 10 is mounted upon traction wheels 14 and includes a hydraulically-actuated materials handling bucket 16 disposed on the forward end thereof. The rear frame 12, which is supported on traction wheels 18, has the motive power mounted therein and provides a vehicle operator's seat 20 disposed on the upper forward end thereof. A pivot construction 22 interconnects the front and rear frames of the vehicle and includes a pair of vertically-spaced arms 24 and 26, respectively, secured to the rear frame 12.

A second pair of vertically-spaced arms 28 and 30 are rigidly secured to the front frame 10 and extend rearwardly from frame 12 toward the arms 24 and 26 with the ends thereof in horizontally-extended, overlapped relation to the ends of arms 24 and 26 and so spaced as to be interconnected with one another by upper and lower bearing structures 32 and 34 forming pivot construction 22. Attention is drawn to the fact that the upper arms 24 and 28 are of heavier plate thickness than the lower arms 26 and 30, the reason for which will be hereinafter explained.

The upper bearing structure 32 interconnecting the arms 24 and 28 includes a pivot pin 36 having a conical portion 38 adapted to be received in a mating opening 40 of arm 24 and a spherical ball portion 42 received in bearing relation in outer bearing 44. The outer bearing 44 includes upper and lower races 46 and 48 having inner peripheral spherical surfaces in bearing relation with spherical ball portion 42, and is securely mounted in an opening 50 in arm 28. The opening 50 is disposed on the same vertical axis as opening 40 in arm 24.

A reinforcing plate or ring 52 is welded on the upper side of arm 24 and includes an inner conical surface 54 forming an extension of the surface of opening 40 in arm 24 so as to receive the end portion of the conical portion 38 of pin 36 therein. A threaded portion 56 of pin 36 disposed on the small end of conical portion 38 extends outwardly past the ring 52 and has a hexagonal nut 58 threaded thereon with the underside of the nut bearing on the upper side of ring 52 effective to lock the portion 38 of pin 36 relative to arm 24.

A reinforcing plate or ring 60 is welded or otherwise permanently secured to the upper side of arm 28 and has an opening 62 therethrough complementary to opening 50 of arm 28 in which a portion of the upper race 46 of bearing 44 is fitted.

A plate 64 is disposed on the underside of arm 28 so as to enclose the underside of bearing structure 44 in its mounted relation in opening 50 of arm 28. An annular seal 66 encircles the opening 50 of arm 28 and is disposed in an annular groove on the upper surface of plate 64 in sealing relation against arm 28. The plate 64 is secured to arm 28 by a series of bolts having heads 68 and threaded shanks 70 extending through vertically aligned openings 72, 74 and 76, respectively, in plate 64, arm 28 and ring 60, with the threaded extremities of the bolts threaded into appropriate threaded openings 78 of an upper housing plate 80 disposed on the upper side of plate 60 in annular sealing relationship therewith relative to opening 62 in plate 60.

The plate 80 has a central opening 82 therethrough encircling a cylindrical portion 84 of pin 36 interconnecting the conical and spherical portions thereof. An annular opening 86 in plate 80, disposed adjacent the upper side of plate 60 forms a chamber in which is disposed a disk spring 88 having its inner peripheral portion bearing axially upon the end surface of upper race 46 of bearing 44 and its opposite outer peripheral surface axially disposed about the end surface of the upper race 46 and impinging upon the undersurface of plate 80.

Disk spring 88 is preferably made of a strength effective to impose a load on the bearing 44 of an amount greater than any vertical load that might be imposed thereon by the operation of the articulated vehicle of which it forms a part.

To provide effective lubrication for the bearing 44 and the mating spherical portion 42 of pin 36 and spherical surfaces of upper and lower races 46 and 48, respectively, a passageway 89 extends the full length of pin 36 and opens into a passageway 94 extending across the inner face of plate 64 adjacent the outer axial surface of bearing race 48. An appropriate lube plug 91 is threaded in the outer opening of passageway 89 in pin 36 through which appropriate lubricant can be added to the bearing structure as needed. A passageway 90, closed by a plug 96, serves as an air bleed when filling with lubricant. A conventional lip seal 93 acting on surface 84 of pin 36 maintains the lubricant within the bearing structure.

The lower bearing structure 34 includes a pin 98, having an end threaded portion 100, an intermediate conical portion 102, and an opposite cylindrical end portion 104. The conical end portion of the pin is received in a conical opening 106 in arm 26 and an adjacent conical opening 108 forming a continuation of conical opening 106 in arm 26, said opening being formed in a reinforcing ring 110 permanently secured upon the upper side of arm 26.

The conical portion 102 of pin 98 is fixed in conical openings of arm 26 and ring 110 by an hexagonal nut 112 threaded upon threaded portion 100 of pin 98, with the underside of the nut bearing upon the upper side of ring 110 so as to lockingly secure the pin 98 in relation to arm 26 and ring 110. The pin 98 in its mounted relation in arm 26 extends vertically through an opening 114 formed in arm 30, wherein a bearing 116, including race 118, is fitted in openings 122 and 114 formed respectively in a ring 126 permanently secured on the upper side of arm 30, and arm 30.

Figure 2:
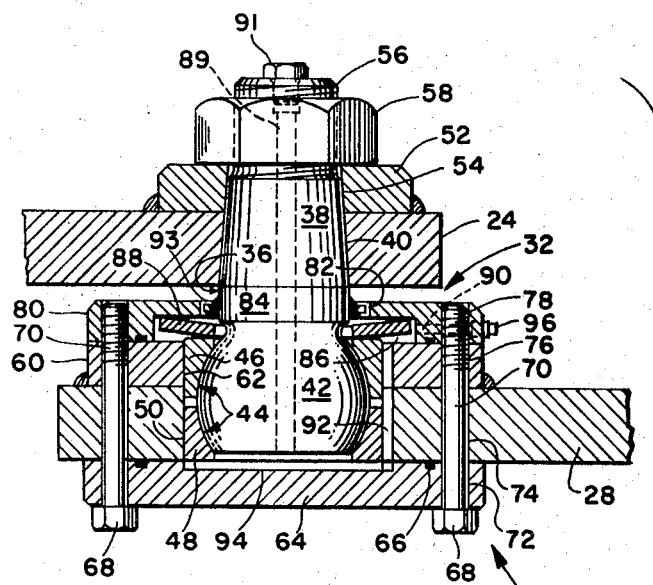
FIG. 2 is a vertical sectional view showing the upper and lower bearing structures of the pivot construction taken along the lines 2—2 of FIG. 1.
Figure 2:
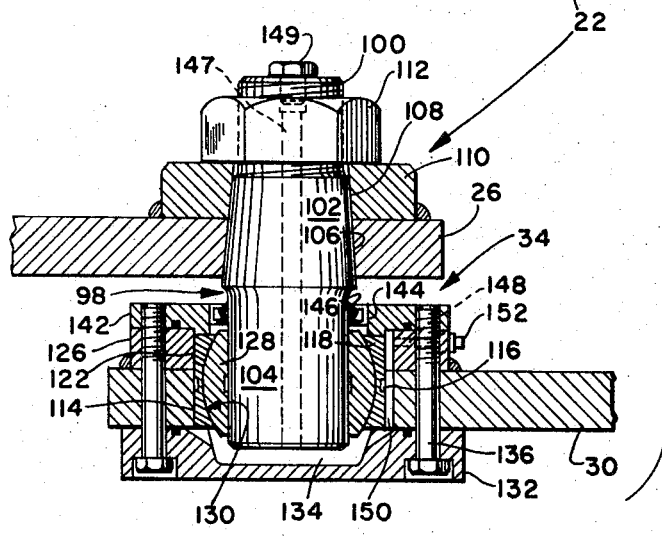

As disclosed by FIGS. 1 and 2, pins 36 and 98 are located on a common vertical axis and thus permit through said pins and their associated bearing structures the vertical displacement of the frames 10 and 12 relative to one another.

A ring bearing member 128 having a cylindrical inner surface is received in bearing relation on the cylindrical portion 104 of pin 98. An outer spherical portion 130 thereof is in bearing relation with the inner spherical portion of race 118 of bearing 116. An end plate 132 is mounted on the underside of arm 30 with appropriate sealing means therebetween and has a central cavity 134 in which end portions of bearing 116 and cylindrical portion 104 of pin 98 are adapted to extend.

End plate 132 is secured upon arm 30 by a series of bolts 136 extending through aligned appropriate openings in plate 132, arm 130 and ring 126, with the threaded portions of said bolts threadingly secured in an end plate or ring 142 having one surface thereof sealingly disposed upon the upper surface of ring 126, with a central opening 144 encircling a portion of the cylindrical portion 104 of pin 98 near the juncture of said cylindrical portion 104 with said conical portion 102.

A lip seal 146 is mounted in opening 144 of ring 142 and acts on the cylindrical surface of cylindrical portion 104 of pin 98. The ring 142, together with sealing member 146 and end plate 132, provide a totally sealed enclosure for the bearing structure.

Lubricant passageway 147 extends the full length of pin 98 and opens into passageway 134 extending across the inner face plate 132. A lube plug 149 is threaded into the opening 147 in pin 98. A passageway 148, closed by a plug 152, serves as an air bleed when the bearing is filled with lubricant.

It is to be noted that through the arrangement of arms 26 and 30, with arm 26 attached to frame 12 and arm 30 attached to frame 10, any tendency of angular or vertical motion between the arms is accounted for by the floating relation of pin 98 through its cylindrical portion as mounted in bearing member 128 and in turn the pivotal relation of bearing member 128 as arranged in race 118. In the upper bearing structure wear is automatically compensated for by the spring 88.

Through the use of the disk spring 88 having a preload value greater than any vertical load which may be imposed on the upper bearing structure 32, the vertical position of the bearing structures relative to frames 10 and 12 remains rigid even under conditions wherein the front wheels 14 are off the ground. With the spring in this position it does not have to support the rear frame weight during breakout and hoisting.

During crowding conditions, a vertical load is transferred from the front frame 10 spring 88 to bearing race 46, to spherical portion 42 of pin 36. Bearing race 48 is not loaded vertically during crowd conditions.

With the aforesaid stated preload on bearing 44, the bearing races 46 and 48 are held in secured bearing relation on spherical portion 42 of pin 36 and their separation is prevented, thus eliminating working the spring 88 which would tend to shorten its useful life.

It is to be noted that the arms 26 and 30 associated with lower bearing structure 34 are of thinner gauge than arms 24 and 28 since no vertical load is transferred between frames 10 and 12 due to the floating action of bearing structure 34 in relation to bearing structure 32.

Aside from the permissible difference in gauge thickness of arms 24 and 28, relative to arms 26 and 30, the vertical reversal of position of bearing structures 32 and 34, together with their associated arms is possible without minimizing the effect of the pivot construction 22 in the performance of its function between frames 10 and 12.

We now claim:

1. A pivotal construction for an articulated vehicle comprising two segments, one of which segments interconnects a pair of substantially parallel, horizontally disposed first and second arms and the other segment interconnects a second pair of substantially parallel, horizontally disposed, oppositely extending third and fourth arms formed on respective front and rear portions of such vehicle, said pair of third and fourth arms being vertically spaced from said pair of fist and second arms comprising:

a member having a part rigidly secured to said first arm and another part extending vertically from said first part defining a bearing surface, a bearing supported in said second arm having a bearing surface in mating engagement with said bearing surface of said first part, resilient means imposing a vertical load upon the engaged bearing surfaces, said bearing and second part having a substantially common vertical axis, a member having a part rigidly secured to said third arm and another part extending vertically from said third arm, and a bearing structure disposed in floating relation between said another part extending from said third arm, and said fourth arm, and permitting vertical movement between said third and fourth arms.

2. A pivotal construction according to claim 1 wherein said mating bearing surfaces have complementary spherical form and the vertical axis of said first part and the vertical axis of said bearing structure are substantially the same.

3. A pivotal construction according to claim 2 wherein said resilient means is in the form of a spring.

4. A pivotal construction according to claim 2 wherein said first and second arms are disposed vertically above said third and fourth arms.

5. A pivotal construction according to claim 2 wherein said first and second arms are made of heavier gauge than said third and fourth arms.

* * * * *